Feb. 25, 1936.  O. CHOUINARD  2,032,200
METHOD OF AND SYSTEM FOR REPRODUCING SOUND FROM SOUND FILMS
Filed Oct. 15, 1929
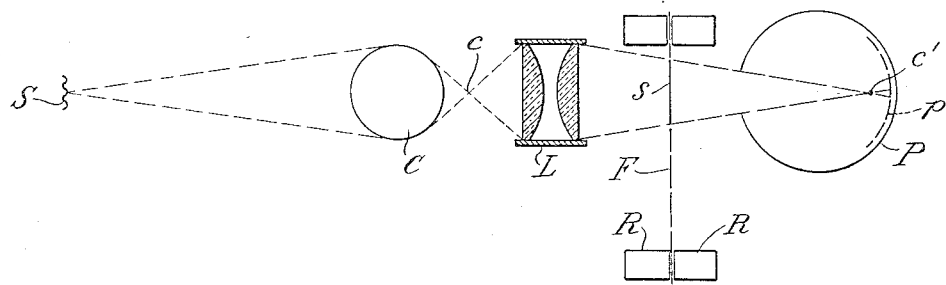
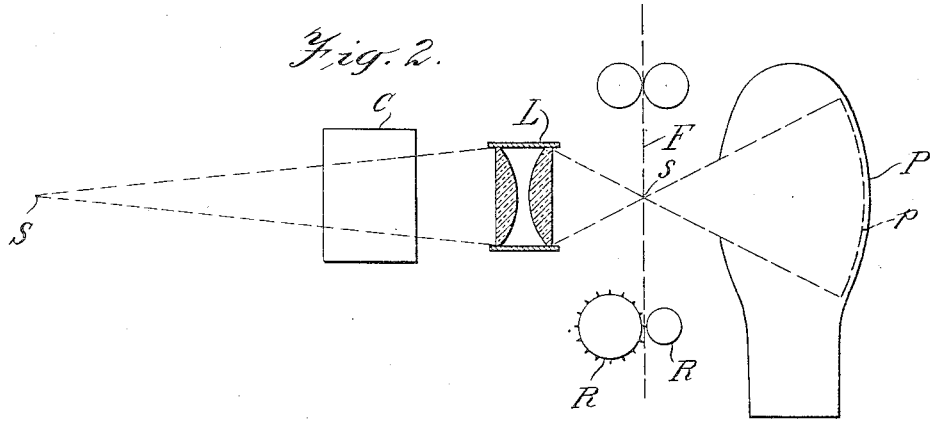
INVENTOR
Oscar Chouinard
BY
ATTORNEY Patented Feb. 25, 1936

2,032,200

UNITED STATES PATENT OFFICE 2,032,200

METHOD OF AND SYSTEM FOR REPRODUCING SOUND FROM SOUND FILMS

Oscar Chouinard, New York, N. Y., assignor, by mesne assignments, to Radio Corporation of America, New York, N. Y., a corporation of Delaware Application October 15, 1929, Serial No. 399,851

2 Claims. (Cl. 179—100.3)

This invention has to do with the reproduction of sound recorded on a sound film and reproduced most usually in conjunction with the display of moving pictures, a form of entertainment which is commonly known as sound or talking moving pictures. As is well known, the sound track of the film is composed of a succession of photographically produced transverse lines varying in intensity and frequency according to modulations of the sound recorded. To reproduce the sound from the film a narrow streak or line of light is thrown on the sound track of the film parallel to the lines on the film, and is caused to traverse the same by longitudinal movement of the film. The light which passes through the film strikes the sensitive layer of a light sensitive electrical device, such as a polarized photoelectric cell, the current output of which, so modified by the variations of the light effected by the lines on the sound track, is amplified and utilized to energize a loud speaker unit.

For clarity and faithfulness of reproduction of the sound, the optimum desideratum is that the line of light projected upon the sound track of the film shall be no wider than the narrowest lines upon the sound track and shall not exceed in width the narrowest spaces between the lines. However, it has been impossible heretofore to obtain even an approximation of this result. The practice has been to employ a narrow slit in an opaque screen on which the light from a suitable source is focused by means of a condensing lens system, the photographic film either being passed immediately back to the screen with the sound track registering with the slit, or being passed through an optical image of the slit which is formed by means of a suitable lens system, the sound film being so related to the light beam that the image of the slit falls sharply upon the sound track. The objection to this method, however, has been that, due to interference and other phenomena, it has not been possible to obtain a sufficiently sharp and well defined line of light, and furthermore, that the light after passing through the slit and the light track of the film is divergent in all directions or planes, and consequently not only is considerable of the light lost so far as its effect upon the photo-electric cell is concerned, but that which does fall upon the sensitive layer of the photo-electric cell is diffuse and non-concentrated and hence ineffective relative to the intensity of the light source. This is due to the fact that each separate point of the slit is virtually a new light source emitting light in all directions within a certain solid conical angle toward the photo-electric cell. The light energy radiating through any given point thus quickly diffuses itself over a wave front which grows rapidly wider in all directions equally as it travels toward the photo-electric cell.

The present invention is characterized by the absence of any slit in an opaque screen with its attendant unavoidable objectionable features. By the present invention the character of the light beam is so modified that the line of light which falls upon the photographic film is materially improved over that produced by a slit, being much sharper and better defined; also, the line of light produced in accordance with this invention does not consist of a row of adjacent points each one of which individually is the point focus or point cross section of a bundle of rays originating at the conjugate point of the source and in turn becoming a new point source in the plane of the film, radiating toward the photo-electric cell light which diverges in all directions. On the contrary, the sharp line of light produced in accordance with this invention in the plane of the photographic film consists of superimposed or closely adjacent overlapping parallel lines of light each one of which is individually the line focus or line cross section of the bundle of rays originating at the conjugate point of the source; while beyond this line focus or line cross section the bundle of rays diverges toward the photo-electric cell in the plane at right angles to the said line focus but converges toward a second line focus or line cross section in the plane parallel to the first line focus.

This result is obtained by employing an astigmatic lens system and utilizing the first line focus of the astigmatic bundle of rays as the line of light traversing the sound track of the film while so disposing the photo-electric cell that its sensitive layer is proximate to the second line focus. In this way not only do I obtain an extremely sharp line of light upon the sound track of the film but I also am able to maintain the light energy radiated through the line focus in the plane of the film toward the photo-electric cell, concentrated over a cross section of small area which again collapses to another line focus within the photo-electric cell, preferably substantially upon the sensitive layer of the cell. This concentration of the light energy upon the sensitive layer of the cell, instead of its diffusion over a wide area of the cell, results in sharper and less blurred tones reproduced from fluctuations of the current across the cell.

With the aid of the accompanying diagrams I shall now explain one system for carrying out my invention and shall thereafter point out my invention in claims.

Fig. 1 is a diagrammatic representation in plan of one optical system for carrying out my invention;

Fig. 2 is a representation of the same in side elevation.

The mode illustrated in the drawing for obtaining the line foci above referred to is by interposing a cylindrical lens element in the path of the light beam. The light source S is shown as a horizontal line filament. The cylindrical lens C is shown as a strongly converging double-convex cylinder placed anterior to the objective lens system L. The usual feeding rollers R are employed to feed the sound film F, and immediately back of the sound film is the photo-electric cell E positioned to receive upon its sensitive layer $p$ the light transmitting through the film F.

The action of the lens system upon the light rays in the two planes is indicated on the drawing. In the plane normal to the axis of the cylinder C, as shown in Fig. 1, the light from any point source is brought to a line focus $c$ parallel to the axis of the cylinder. The lens system L produces an image of the focus $c$ at the line $c'$.

In the axial plane of the cylinder, as shown in Fig. 2, the light from any point source falls upon the anterior face of the lens system L substantially without refraction by the cylindrical lens, since the cylindrical lens has no lenticular power in its axial planes. This light therefore is brought to a focus at $s$ which is the conjugate point of the light source. However, due to the presence of the cylinder C and the consequent astigmatic character of the bundle of light from the point source being considered, the focus $c$ is not a point focus but is a line focus or line cross section of the bundle or rays in this plane.

From this line focus $s$ the bundle of rays diverge toward the photo-electric cell P in the plane at right angles to the line focus $s$, but in the plane containing the line focus $s$ they still converge toward the second line focus $c'$ as shown in Fig. 1. It is understood that the distance between the two line foci $s$ and $c'$, which is known as the interval of Stürm, depends upon the index of refraction of the cylindrical lens and also its position in the beam of light with respect to the lens system L; as the line focus $c$ is advanced or retracted, the image $c'$ of this focus will be correspondingly advanced or retracted. The position of the line focus $s$ is, however, independent of the position of the cylinder and will always be in the focus of the lens system L for points of the light source S. In other words, the position of the line focus $s$, with whatever cylindrical element obtained, will always be in the same plane as the point focus obtained without the cylindrical element, while the position of the second line focus $c'$ varies with the cylindrical element employed and its position in the light beam.

I have found that superior results are obtained by so disposing the photo-electric cell P that its sensitive layer $p$ is substantially in the plane of the second line focus $c'$, as indicated on the drawing, but it will be understood that slight variations from this exact coincidence are immaterial.

Except for intensity of the line of light $s$, this line is the same for the point source or a line source of light. However, I employ a line source at right angles to the axis of the cylindrical lens in order to get the desired intensity of the line of light $s$. It is desirable that the width of the light source in a direction parallel to the axis of the cylinder shall be small since the width of the line $s$ will be proportional thereto. Slight imperfections and waves of the filament are not a serious objection since with the cylindrical element present, each point of the filament is reproduced in the plane of the film as a sharp line at right angles to the axis of the cylinder, the whole pattern of point sources constituting the source being reproduced by a pattern of superimposed or closely adjacent parallel, overlapping lines which therefore obliterate any irregularities of the filament and give a sharply defined homogeneous line of light in the plane of the film which is superior in sharpness, intensity and homogeneity to that obtained by prior systems. This is true because without the cylindrical element the image of the filament in the plane of the film reproduces point by point all the irregularities of the film in every dimension. Furthermore, the astigmatic character of the bundle of rays from each point source after they are transmitted through the film, results in a maximum number of the rays entering the photo-electric cell through a small anterior opening and the maximum concentration of those rays upon the sensitive layer of the cell.

As is well understood, the photo-electric cell is polarized by proper voltage and its current output is amplified and employed to energize the loud speaker in a well known way.

It will be understood that the invention is by no means limited to the precise system employed for the purpose of illustration, since the bundle of rays can be rendered astigmatic and the above described phenomenon of line foci be produced by employing either a positive or a negative cylindrical lens element placed along the path of the light rays anywhere between the light source and the photographic film. For example, it will be understood that the cylindrical element may be within the lens system L and combined with one or more of the refracting surfaces thereof in the form of a cylindrical or sphero-cylindrical surface or surfaces. Other modifications within the scope of my invention will also readily suggest themselves to those skilled in the art. I also wish it to be understood that while I refer herein to the light sensitive device as a photo-electric cell, I do not intend thereby to exclude a selenium cell or any suitable form of light sensitive electrical device, the term being generic to any such device suitable for the purpose.

I claim:

1. An optical system for a photoelectric sound reproducer comprising an elongated light source parallel to the plane of the sound record, a cylindrical lens between said source and the record with its axis parallel to the direction of movement of the sound record and forming a line image of said source between itself and the record, a spherical lens between said line image and the record and forming an image of said line image on a photocell and forming an image of said source in an intermediate plane, and means to guide a film in said intermediate plane with its soundtrack in alignment with said image.

2. An optical system for a photoelectric sound reproducer comprising a narrow elongated light source transversely parallel to the plane of the sound record, a cylindrical lens between said source and the record with its axis parallel to the direction of movement of the sound record and forming a line image of said source between itself and the record, a spherical lens between said line image and the record and forming an image of said line image on a photocell and forming an image of said source in an intermediate plane, and means to guide a film in said intermediate plane with its soundtrack in alignment with said image.

OSCAR CHOUINARD.